Patented June 19, 1928.

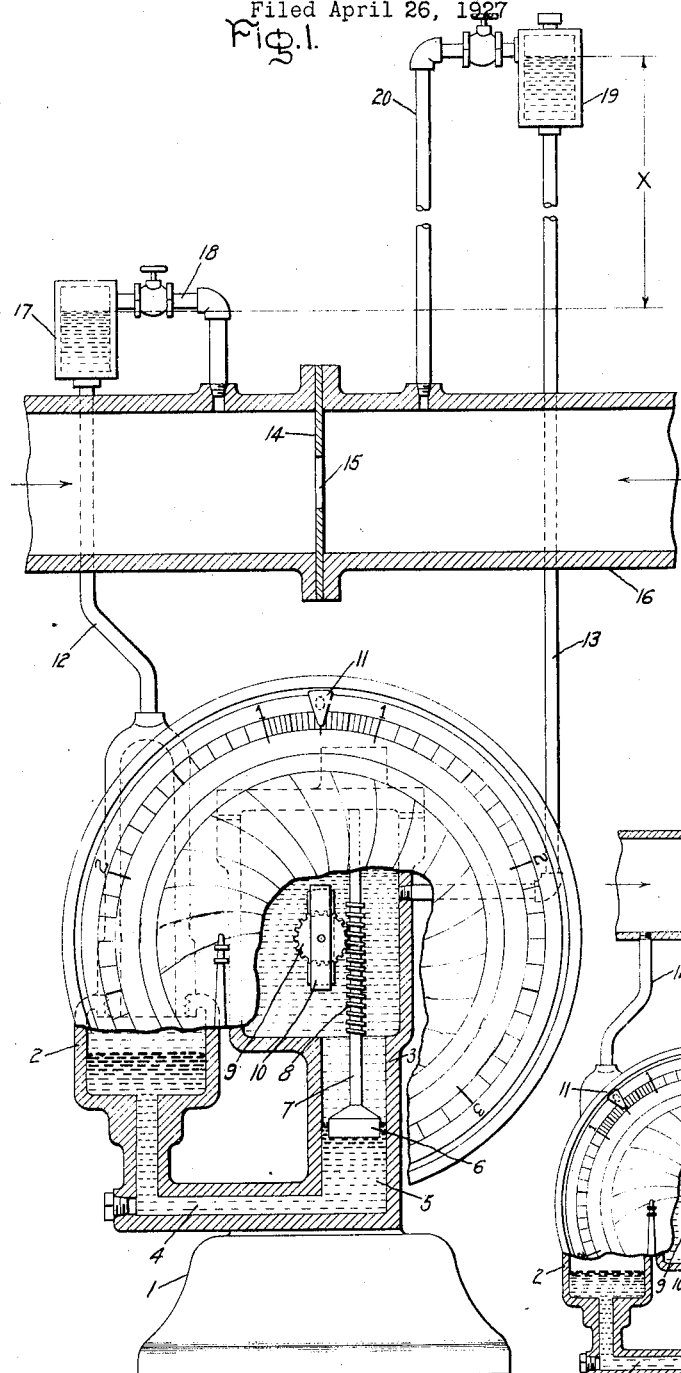

1,674,481

UNITED STATES PATENT OFFICE.

WILLIAM L. PAULISON, JR., OF HACKENSACK, NEW JERSEY, ASSIGNOR TO GENERAL ELECTRIC COMPANY, A CORPORATION OF NEW YORK.

FLOW METER.

Application filed April 26, 1927. Serial No. 186,757.

The present invention relates to flow meters such as are used for measuring the flow of fluids through conduits. In connection with the measurement of the flow of fluids through conduits by means of a flow meter, it becomes desirable sometimes to provide a flow meter which will measure flow in either direction, the meter at the same time indicating the direction of flow. However, the application for meters for this purpose is not extensive so that it is hardly practicable from a commercial standpoint to provide a special line of meters for this use.

The object of my invention is to provide in connection with a flow meter, an arrangement whereby a standard flow meter calibrated and adapted for use in measuring flow only in one direction may be converted readily and without substantial change into a meter capable of measuring flow in either direction and indicating the direction of the flow.

For a consideration of what I believe to be novel and my invention, attention is directed to the accompanying description and the claims appended thereto.

In the drawing, Fig. 1 is a side elevation, partly in section, of a flow meter installation embodying my invention, and Fig. 2 is a detail view of another application of the invention.

Referring to the drawing, 1 indicates a flow meter instrument of known type, it being in the present instance an instrument of the type disclosed in the patent to Mapelsden, 1,481,921, Jan. 29, 1924. It comprises essentially two legs 2 and 3 united by a transverse passage 4, thereby forming what is in substance, a U-tube. In the U-tube is an indicating liquid 5 such as mercury. Riding on the mercury in U-tube leg 3 is a float 6 provided with a stem 7 upon which is a rack 8 meshing with a gear wheel 9. Through suitable magnetic transmission 10 gear wheel 9 transmits oscillating movement to a pointer 11 the pointer being mounted on the shaft of the magnetic motion-transmitting means. When float 6 moves upward, gear wheel 9 is turned in an anticlockwise direction, thereby moving pointer 11 toward the left, while when the float 6 moves downward gear wheel 9 is rotated in a clockwise direction, thereby moving pointer 11 toward the right. Connected with U-tube legs 2 and 3 are pipes 12 and 13 which are connected to a pressure-difference-creating device in the conduit through which the fluid to be metered flows. In the present instance, the pressure-difference-creating device is shown as being in the form of a plate 14 provided with an orifice 15, the device being located in a conduit 16. The construction so far described is that of a known type of flow meter and is to be taken as typical of any suitable flow meter structure comprising a pressure-responsive instrument in the form of a U-tube, a pressure-difference-creating device, and connections for conveying the pressure difference created by the pressure-difference-creating device to the two legs of the U-tube.

According to my invention, I provide in connection with the U-tube and the indicating liquid therein, a liquid head which produces a certain deflection of the indicating liquid. This serves to position the indicating pointer 11 in a certain predetermined position at no flow which is the zero position. I then provide the indicating instrument with a special chart or scale plate which has its zero at the zero position of the pointer, the scale extending in each direction from the zero point. With this arrangement, therefore, if the flow is in one direction, the pressure-difference-creating device will operate to effect movement of the pointer to the right, while if the flow is in the other direction the pressure-difference-creating device will operate to effect movement of the pointer to the left. The flow meter will operate, then, to measure flow in either direction and indicate in which direction the flow is taking place.

In Fig. 1 of the drawing, the invention is shown applied to a flow meter for measuring the flow of steam or other condensible vapor through a conduit. In this arrangement the pipe 12 is connected to the bottom of a reservoir 17 which in turn is connected at a point adjacent its upper end to the conduit 16 by a pipe 18. The pipe 13 is connected to the bottom of a reservoir 19, the upper end of the reservoir being connected by a pipe 20 to the conduit 16.

When operating as a flow meter for steam or other condensible vapor, the pipe 12 and reservoir 17 and the pipe 13 and reservoir 19 becomes filled with condensate up to the levels indicated in the reservoirs which levels are defined by pipe connections 18 and 20. In carrying out my invention for this application, I locate the reservoir 19 at a point sufficiently higher than the reservoir 17 that the head of the liquid in pipe 13 and reservoir 19 exceeds the head of the liquid in pipe 12 in reservoir 17 by an amount sufficient to effect the desired permanent deflection of the indicating liquid 5, that is, the deflection required to bring the indicating pointer to zero position on the scale at no flow.

Fig. 1 of the drawing shows the no flow position of the parts and it will be seen that the liquid 5 is depressed in leg 3 and is raised in leg 2 by a certain amount, the arrangement being such, as already pointed out, that pointer 11 stands at zero on the scale plate. If now flow takes place through the conduit from left to right, there will be a drop in pressure across orifice 15 which will effect a lowering of the level of the indicating liquid in leg 2 and a raising of the level of the liquid in leg 3. This will turn pointer 11 toward the left indicating a certain amount of flow from left to right in the conduit. If flow takes place in the conduit from right to left, there will be a drop in pressure across orifice 15 which will serve to lower the level of the liquid in leg 3, thus permitting the float 6 to move downward and turn the pointer 11 toward the right, thus indicating and measuring a flow in the other direction. When the indicating liquid 5 deflects, the liquid in one of the reservoirs 17 or 19 spills over into the conduit, depending upon the direction of deflection, while the level of the liquid in the other reservoir lowers somewhat. However, the reservoirs quickly fill to their former levels due to condensation so that the accuracy of the instrument is affected only momentarily. Also, the reservoirs are made of a diameter so large that the variations in the level of liquid which occur during normal operation are small and so have but little effect on the deflection of the indicating liquid.

In Fig. 2 is shown diagrammatically an arrangement for measuring the flow of a non-condensible fluid such as air. In this case I provide in the one leg 3 of the U-tube sufficient non-vaporizing liquid 21 to effect the depression of the indicating liquid 5 required to give the instrument its zero setting. In this case, the leg 2 would have no liquid above the indicating liquid. The operation of the arrangement shown in the Fig. 2 construction will be understood readily from the description given already in connection with the Fig. 1 construction.

By the above arrangement, I am enabled to take a standard flow meter designed for operation for one direction of flow only and convert it into an instrument capable of measuring flow in either direction and this without affecting the calibration constants of the instruments.

In the present instance, I have shown the zero in Fig. 1 as being at the midpoint on the scale. However, it may be arranged at any other intermediate point. If, for example, it is desired to measure greater flow in one direction than in the other, then the zero may be arranged at a point such that greater deflection may take place for the one direction of flow than for the other. This is illustrated in Fig. 2 wherein it will be seen that the zero is located to one side of the center of the scale.

By my invention, it will be seen that I am enabled to take a standard flow meter designed for operation in only one direction and convert it into a flow meter capable of measuring flow in either direction by providing a suitable scale plate to indicate flow in either direction and the means for effecting the initial deflection of the indicating liquid. These are things which can be done easily and at low cost.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is,—

1. In a flow meter, a U-tube, indicating liquid in the U-tube, means associated with one leg of the U-tube for indicating the level of the indicating liquid therein, and a second liquid in a leg of the U-tube which produces a certain deflection of the indicating liquid to establish a zero flow point on the indicating means at a point other than that at which the indicating means stands when the liquid in the two legs of the U-tube stands at the same level.

2. A flow meter comprising a U-tube having a leading leg and a trailing leg, indicating liquid in said legs, means associated with one leg of the U-tube for measuring deflection of the indicating liquid therein, and means providing a liquid head which effects a certain deflection of the indicating liquid to establish a zero flow point on the deflection measuring means at a point other than that at which the deflection measuring means stands when the indicating liquid in the two legs of the U-tube are at the same level.

3. A flow meter comprising a U-tube having a leading leg and a trailing leg, indicating liquid in the U-tube, an indicating pointer, means for positioning said pointer in accordance with the level of the indicating liquid in one leg of the U-tube, a scale plate over which the pointer moves, said scale plate having a scale thereon the zero point of which corresponds with a certain deflection of the indicating liquid, and means providing a liquid head which effects a deflection of the indicating liquid such that at zero flow the indicating pointer stands at zero on the scale.

4. A flow meter comprising a leading leg and a trailing leg, indicating liquid in said legs, means associated with one of said legs for measuring deflection of the indicating liquid therein, and means which effects a certain deflection of the indicating liquid to establish a zero flow point on the deflection indication means at a point other than that at which the deflection indicating means stands when the liquid in the said two legs stands at the same level.

5. The combination of a conduit through which a condensable vapor to be metered flows, a pressure difference-creating device, a U-tube indicating instrument, an indicating liquid therein, indicating means associated with said U-tube and having a zero flow point at a point other than that at which said indicating means stands when the liquid in the two legs of the U-tube stands at the same level, and pipes connecting the U-tube indicating instrument to the conduit, one of said pipes extending to a level above the other by an amount such that when filled with condensation from said conduit it effects a deflection of the indicating liquid such that at zero flow the indicating means stands at the zero flow point.

In witness whereof, I have hereunto set my hand this 23 day of April, 1927.

WILLIAM L. PAULISON, Jr.